(12) United States Patent
Ladkani et al.

(10) Patent No.: US 11,921,582 B2
(45) Date of Patent: Mar. 5, 2024

(54) OUT OF BAND METHOD TO CHANGE BOOT FIRMWARE CONFIGURATION

(71) Applicant: Microsoft Technology Licensing, LLC, Redmond, WA (US)

(72) Inventors: Neeraj Ladkani, Bothell, WA (US); Kuo-Shu Huang, Woodinville, WA (US); James George Cavalaris, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/733,429

(22) Filed: Apr. 29, 2022

(65) Prior Publication Data

US 2023/0350756 A1 Nov. 2, 2023

(51) Int. Cl.
*G06F 11/00* (2006.01)
*G06F 11/07* (2006.01)
*G06F 11/14* (2006.01)

(52) U.S. Cl.
CPC ...... *G06F 11/1417* (2013.01); *G06F 11/0772* (2013.01); *G06F 11/0784* (2013.01); *G06F 11/079* (2013.01)

(58) Field of Classification Search
None
See application file for complete search history.

(56) References Cited

U.S. PATENT DOCUMENTS

| | | | |
|---|---|---|---|
| 9,477,545 B2* | 10/2016 | Guo | G06F 11/0721 |
| 9,817,975 B2* | 11/2017 | Liu | G06F 21/554 |
| 10,353,763 B2* | 7/2019 | Song | G06F 11/0778 |
| 11,132,314 B2 | 9/2021 | Maddukuri et al. | |
| 2012/0144245 A1* | 6/2012 | Fan | G06F 11/0787 714/E11.079 |
| 2018/0026835 A1 | 1/2018 | Nachimuthu et al. | |
| 2018/0157525 A1* | 6/2018 | Song | G06F 13/24 |
| 2019/0065172 A1 | 2/2019 | Nachimuthu et al. | |
| 2020/0218527 A1* | 7/2020 | Ganesan | G06F 8/65 |
| 2021/0255939 A1* | 8/2021 | Chaiken | G06F 11/0757 |

OTHER PUBLICATIONS

Google Scholar/Patents search—text refined (Year: 2023).*
"International Search Report and Written Opinion Issued in PCT Application No. PCT/US23/012755", dated May 22, 2023, 15 Pages.

* cited by examiner

*Primary Examiner* — Christopher S McCarthy
(74) *Attorney, Agent, or Firm* — Workman Nydegger

(57) ABSTRACT

A computer system is configured to manage a value of a variable via firmware. Managing the value of the variable includes detecting a system management interrupt (SMI), causing the computer system to enter a system management mode, in which a request associated with the SMI is handled by the firmware. In response to determining that the SMI is generated by a baseboard management controller (BMC) and that a cause thereof is associated with reading or writing a value of a variable, one or more parameters associated with the variable are obtained from the BMC. Based on the cause of the request and the one or more parameters, the value of the variable is read or overwritten with a new value. The value or the new value is then sent to the BMC, which in turn passes the value or new value to a second computer system over a network.

20 Claims, 6 Drawing Sheets

OUT OF BAND METHOD TO CHANGE BOOT FIRMWARE CONFIGURATION

BACKGROUND

A computer system generally has three layers of software, including firmware (e.g., UEFI/BIOS), operating system (e.g., Windows, Linux), and applications. The UEFI/BIOS is firmware that contains a collection of assembly language routines that allow programs and the components of a computer to communicate with each other at a low level. The three layers of software turn a computer into a useful machine over three stages. During the first stage, the UEFI/BIOS is configured to load a bootstrap loader. Thereafter, during the second stage, the bootstrap loader is configured to load an operating system. Finally, the operating system is configured to load application programs during the third stage.

In current cloud service solutions, UEFI/BIOS firmware settings are generally tied to fixed platform flavor, validated during bootstrapping and production. However, in some circumstances, UEFI/BIOS firmware settings can be modified inadvertently. This could lead to security issues, because the modified UEFI/BIOS settings can cause various security issues or performance issues. For example, the modified UEFI/BIOS settings may result in untrusted and/or compromised platform configurations, exposing customers to security risks. Alternatively, or in addition, the modified UEFI/BIOS settings may also result in degraded performance profiles, impacting the workloads of customers. Further, in some cases, the modified UEFI/BIOS firmware settings can also prevent the computer system or server from starting up.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computer system having one or more processors, a baseboard management controller (BMC), and one or more computer-readable hardware storage devices. Computer-executable instructions, including firmware, are stored on the one or more computer-readable hardware storage devices. When the computer-executable instructions are executed, the computer system is configured to manage a value of a variable via the firmware.

Obtaining the value of the variable includes detecting a system management interrupt (SMI). The SMI causes the computer system to enter a system management mode, in which a request associated with the SMI is handled by the firmware. The computer system then determines that the SMI is generated by the BMC. In response to determining that the SMI is generated by the BMC, the computer system then determines a cause of the SMI. In some embodiments, the BMC is configured to store the cause of the SMI in shared memory, and determining the cause of the SMI includes accessing the shared memory to obtain the cause of the SMI.

In response to determining that the cause of the SMI is associated with reading or writing a value of a variable, the computer system then sends a request to the BMC for one or more parameters associated with the variable. The one or more parameters include at least one of a name, a globally unique identifier (GUID), an offset, a length, or a new value of the variable.

In response to receiving the one or more parameters associated with the variable, the computer system reads or writes the value of the variable based on the cause of the request and the one or more parameters of the variable. For example, when the cause of SMI is associated with reading the value of the variable, the value of the variable is read. When the cause of SMI is associated with writing the value of the variable, the value of the variable is overwritten with the new value. The computer system then sends the value of the variable to the BMC, causing the BMC to pass the value of the variable to a second computer system over a network.

In some embodiments, the BMC is configured to receive an out-of-band request for reading or writing the value of the variable from the second computer system over the network. In response to receiving the request from the second computer system, the BMC is configured to generate a request indicating the cause of the SMI and generate the SMI.

In some embodiments, the variable is a boot firmware configuration variable. In some embodiments, the variable is a unified extensible firmware interface (UEFI) boot firmware configuration variable and/or basic input/output system (BIOS) firmware configuration variable. In some embodiments, the one or more parameters include at least one of a name, a globally unique identifier (GUID), an offset, a length, and/or the new value of the variable. In some embodiments, the BMC is configured to receive the one or more parameters associated with the variable from the second computer system. In some embodiments, sending the request to the BMC for the one or more parameters of the variable is performed via an intelligent platform management interface (IPMI).

The principles described herein are also associated with a method implemented in firmware of a computer system for managing a value of a variable. The method includes detecting a system management interrupt (SMI), causing the computer system to enter a system management mode, in which a request associated with the SMI is handled by the firmware. The method further includes determining that the SMI is generated by a BMC and determining a cause of the SMI. In response to determining that the cause of the SMI is associated with reading or writing a value of a variable, a request for one or more parameters associated with the variable is sent to the BMC. The one or more parameters include at least one of a name, a globally unique identifier (GUID), an offset, a length, or a new value of the variable.

In response to receiving the one or more parameters associated with the variable from the BMC, the value of the variable is read or written based on the cause of the SMI and the one or more parameters. For example, when the cause of SMI is associated with reading the value of the variable, the value of the variable is read. When the cause of SMI is associated with writing the value of the variable, the value of the variable is overwritten with the new value. The value of the variable is then sent to the BMC, and the BMC is then caused to pass the value of the variable to a second computer system over a network.

Additional features and advantages will be set forth in the description which follows, and in part, will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
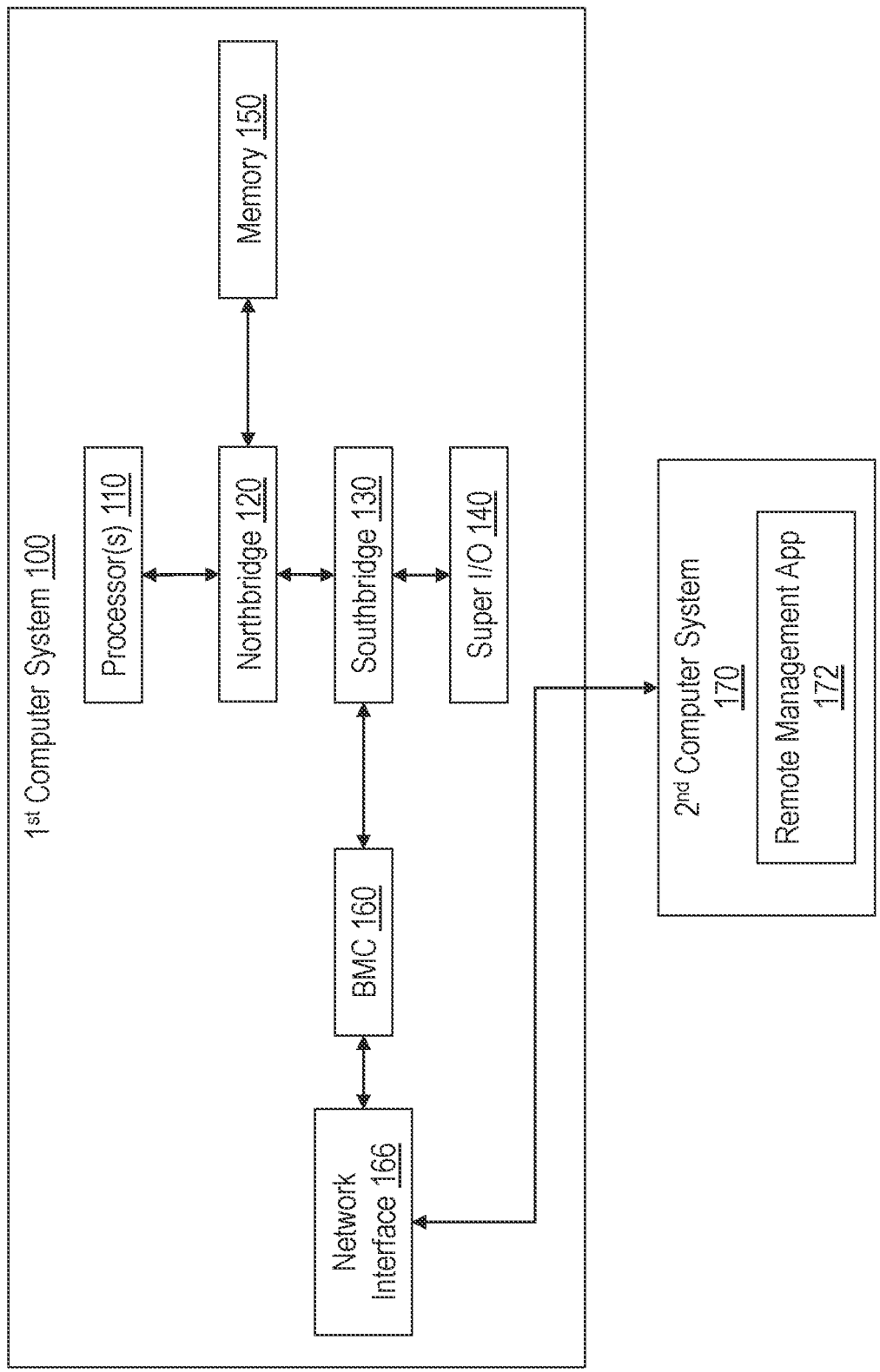
FIG. 1 illustrates an example of a computer system in which the principles described herein may be implemented.

In current cloud service solutions, unified extensible firmware interface (UEFI) and/or Basic Input/Output System (BIOS) firmware settings are often tied to fixed platform flavors. The settings are validated during bootstrapping and/or production. With advanced security threats, UEFI/BIOS firmware settings can be modified inadvertently, and the server with the modified settings may be pushed into production. This leads to security issues and other unpredictable problems because the modified BIOS settings can result in untrusted compromised platform configuration, exposing customers to security risks and/or degraded performance profile, impacting the workloads of customers. Further, in some cases, the modified UEFI/BIOS firmware settings can also prevent the computer system or server from starting up.

When a UEFI/BIOS firmware setting of a computer server is inadvertently modified, the server may be out of service. A system administrator is often required to be physically on-premise to perform diagnostic tests and/or reset all the variables to the original values. The principles described herein provide out-of-band management solutions for obtaining a value of a variable and/or writing a value of a variable remotely, as such settings of a computer system can be diagnosed, modified, and/or corrected remotely.

Out-of-band management is a solution that provides a secure dedicated alternate access method to an information technology (IT) network infrastructure to administer connected devices and IT assets without having to use a corporate local area network (LAN). The primary benefit of an out-of-band management interface is its availability even when the network is down, a device is turned off, in sleep mode, hibernating, and/or otherwise inaccessible. When a network administrator needs to monitor, manage, troubleshoot, or reboot critical IT assets, they will generally access the devices directly over an ethernet network. However, when 24/7 uptime is expected, such a single point of access is not enough. In particular, when IT assets are in off-site locations, controlled server rooms, or the network administrator is in a different location, a secure way to remotely access the IT asset becomes more important.

The principles described herein are related to a computer system configured to use a baseboard management controller (BMC) to enable the out-of-band management solution. The BMC is configured to receive a request from a remote computing system. The request may be initiated by an IT administrator at the remote computing system. In response to receiving the request from the remote computing system, the BMC is configured to generate a system management interrupt (SMI) via GPIO (general-purpose input/output). The SMI causes the computer system to enter a system management mode (SMM), in which a request associated with the interrupt is handled by firmware, such that even when a computer system is not started up, or cannot be turned on, certain variables, such as (but not limited to) UEFI/BIOS firmware configuration variables, stored in a flash or other non-volatile storage devices can still be individually read and obtained out-of-band.

In some embodiments, the BMC uses shared hardware, such as shared memory (also referred to as a "mailbox"), to share a cause of the SMI with the firmware of the computer system. The mailbox is an IO (input/output) mapped device, which has low access cost, such as one CPU instruction. Before generating the SMI, the BMC is configured to write the cause of the SMI into the mailbox. For example, the cause of the SMI can be associated with reading or writing of a variable. Once a component of firmware or BIOS (also referred to as a "variable manager") gets control from SMI, it can read the mailbox to obtain the cause of the SMI. In response to obtaining the cause of the SMI, the variable manager then issues a command to the BMC, requesting one or more parameters of the variable. In some embodiments, the command is an intelligent platform management interface (IPMI) command.

In response to receiving the command, the BMC obtains the one or more parameters and sends a response (e.g., an IPMI response) to the variable manager, including the one or more parameters of the variable. In some embodiments, the one or more parameters of the variable include a name, a globally unique identifier (GUID), an offset, a length, and/or a new value. After the variable manager receives the one or more parameters of the variable, it reads the value of the variable stored, or overwrites the value of the variable with the new value in the non-volatile storage. In some embodiments, the non-volatile storage is a flash or a non-volatile random-access memory. The read value of the variable or the new value written into the variable is then sent back to the BMC. Thereafter, the SMI is cleared via GPIO.

Since the principles described herein are related to a computer system, a brief description of a computer system is provided herein. FIG. 1 illustrates an example of a computer system 100 (also referred to as a first computer system) in which principles described herein are implemented. The computer system 100 includes one or more processor(s) 110 (e.g., CPU), a northbridge 120, a southbridge 130, and a super I/O 140. The northbridge 120 is often a chip in a chipset of a motherboard that directly connects to the processor(s) 110 to handle high-performance tasks. The northbridge 120 is also connected to memory 150. The southbridge 130 is another chip connected to the northbridge 120 configured to handle many of the computer system 100's I/O functions, such as USB, audio, the system UEFI/BIOS. As illustrated, the southbridge 130 is connected to a baseboard management controller (BMC) 160. The BMC 160 is connected to a network interface 166.

The BMC 160 is a specialized service processor configured to monitor physical states of hardware of the computer system. The BMC 160 is connected to the network interface 166. The network interface 166 allows the BMC 160 to communicate with a second computer system 170. The second computer system 170 has a remote management application 172 installed thereon, allowing a system administrator to see the physical states of hardware via the BMC 160.

For the hardware of the computer system 100 to work together, software is stored in hardware storage devices and loaded in the memory 150 to cause the processor(s) 110 to perform computations, read and write from hardware storage devices, and communicate with other computer systems. The computer system 100 generally has three layers of software, including firmware (e.g., UEFI/BIOS), operating system (e.g., Windows, Linux), and applications. The UEFI/BIOS is firmware that contains a collection of assembly language routines that allow programs and the components of a computer to communicate with each other at a low level. The three layers of software turn a computer into a useful machine over three stages. During the first stage, the UEFI/BIOS is configured to load a bootstrap loader. Thereafter, during the second stage, the bootstrap loader is configured to load an operating system. Finally, the operating system is configured to load application programs during the third stage.

BIOS is an older firmware, it continues to operate in 16-bit mode, which results in restricting the amount of code that can be accessed. For example, because BIOS only works in 16 bits, it cannot address more than 1 MB of space. As a consequence, it can only initialize one device at a time, and the booting might take longer. In particular, during booting, BIOS reads the first sector of the hard drive, which contains the address or code needed to initialize the next device. BIOS also determines the boot device that must be initialized for the operating system to run.

On the other hand, UEFI performs similar functions to BIOS but in a different way. UEFI stores all startup and initialization information in a .efi file rather than a firmware file. The file is located on a special partition of the hard drive called EFI system partition. On a computer system, the EFI system partition consists of the bootloader for the operating system installed. UEFI operates in 64-bit mode, meaning it has higher addressable memory, and thus, it makes the booting process faster. Furthermore, UEFI supports networking, so one can troubleshoot remotely even without installing an operating system.

Figure 2:
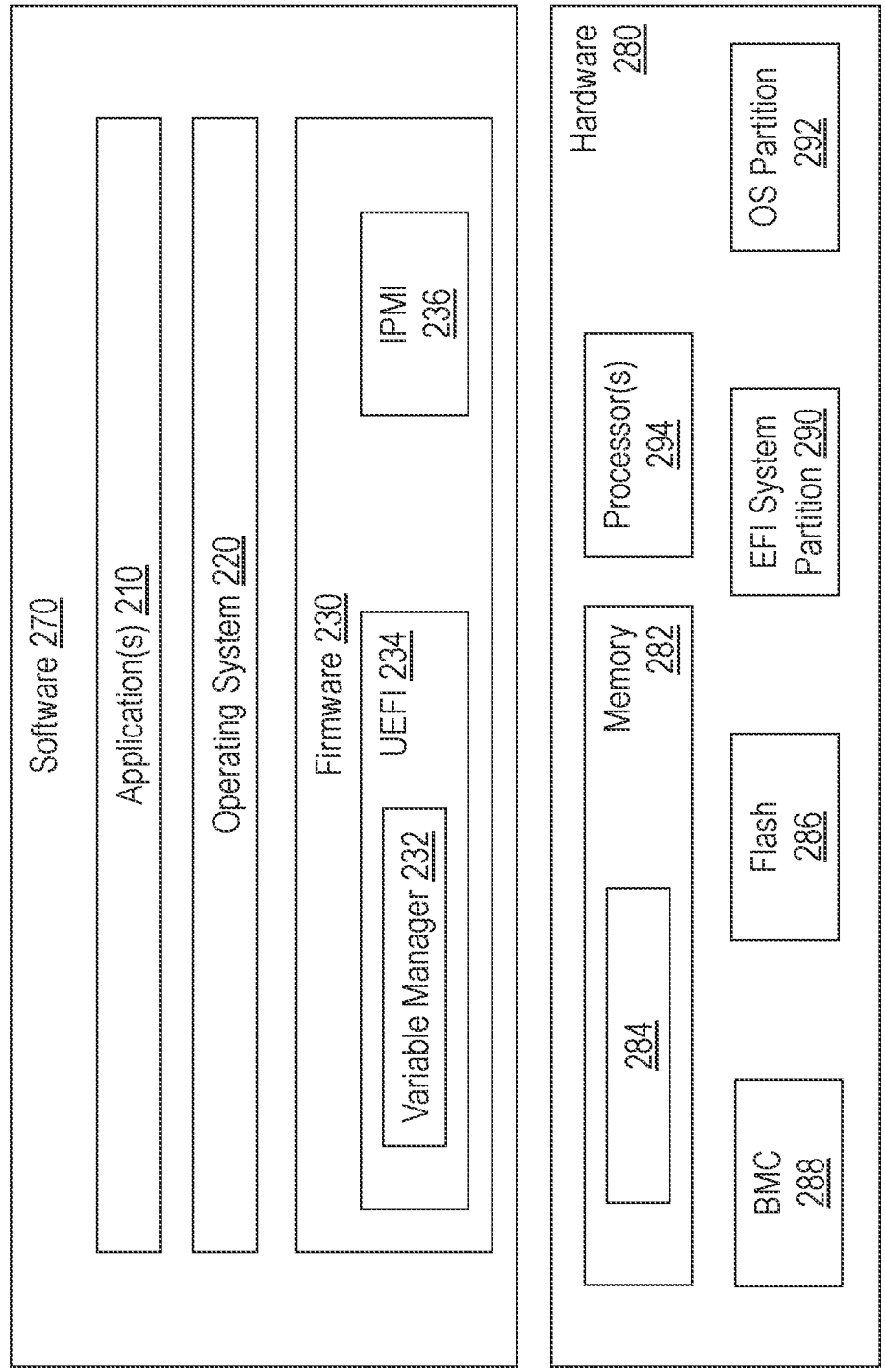
FIG. 2 illustrates an example architecture of a computer system that corresponds to the computer system in FIG. 1.

The principles described herein can be implemented with either UEFI or BIOS firmware. FIG. 2 illustrates an example architecture of a computer system 200 (corresponding to the computer system 100 of FIG. 1) in which the principles described herein are implemented. As illustrated in FIG. 2, the computer system 200 includes hardware 280 and software 270. The hardware 280 includes memory 282, one or more processors 294, a BMC 288, and hardware storage devices, such as a flash 286, EFI system partition 290, and OS partition 292. The software 270 includes three layers, namely firmware 230, operating system 220, and one or more applications 210. The firmware 230 includes UEFI 234 (or BIOS (not shown)) configured to load a bootstrap loader. The bootstrap loader is configured to load the operating system 220, which in turn loads the one or more applications 210. In some embodiments, the one or more applications 210 include cloud service applications.

In some embodiments, the firmware 230 also includes Intelligent Platform Management Interface (IPMI) 236 configured to control BMC 288. IPMI is firmware running on BMC conforming to IPMI standards. IPMI is often implemented on server-class platforms. IPMI defines common, abstracted, message-based interfaces between diverse hardware devices and CPU for out-of-band management.

As illustrated, the UEFI 234 includes a variable manager 232 configured to manage variables in response to detecting an SMI. An SMI is a high-priority unmaskable hardware interrupt configured to cause a CPU to immediately suspend all other activities, including the operating system, and go into a special execution mode called system management mode (SMM). Once the computer system 200 is in SMM, a request associated with the interrupt is handled by firmware 230 and/or UEFI 234. The operating system 220 has no control over when SMIs will happen or how long the CPU will subsequently stay in SMM. In fact, the operating system is often not even aware of the transmissions to and from SMM.

In embodiments, the BMC 288 is configured to generate an SMI via GPIO (general purpose input/output), and share the cause of the SMI using shared memory 284 (also referred to as a "mailbox"). The mailbox 284 is IO mapped device that has low access cost, such as one CPU instruction. Before generating the SMI, the BMC 288 is also configured to write the reason of SMI into the mailbox. Once the firmware 230 gets control from SMI, it can read the mailbox 284 to determine the cause of the SMI.

In response to determining that the cause of the SMI is associated with reading/writing a value of a variable, the firmware 230 is then configured to issue a command for requesting additional information (e.g., one or more parameters) associated with the variable. In response to receiving the request, the BMC 288 then obtains one or more parameters associated with the variable, and sends the one or more parameters to the firmware 230. The one or more parameters include (but are not limited to) a name, a GUID, an offset, length, and/or new value associated with the variable.

When the cause of SMI is associated with reading the variable, no new value is required. After receiving the one or more parameters associated with the variable, the variable manager 232 is configured to read a value of the variable from a hardware storage device based on the one or more parameters, such as the flash 286, the EFI system partition 290, and/or the OS partition 292, and sends the value of the variable back to the BMC 288.

When the cause of SMI is associated with writing the variable, the new value of the variable is used to overwrite the value of the variable. After receiving the one or more parameters associated with the variable, the variable manager 232 is configured to overwrite the value of the variable stored in the hardware storage device with the new value, and send the updated value of the variable back to the BMC 288.

In response to receiving the value of the variable, the BMC 288 can then pass the received value of the variable to a second computer system 170 and/or a remote management application 172. As such, a system administrator can remotely access values of variables of the computer system 200 even when the computer system is not turned on or cannot turn on or start up.

In some embodiments, the command issued by the firmware 230 for requesting additional information associated with the variable is an Intelligent Platform Management Interface (IPMI) command. The BMC then sends the one or more parameters to the firmware 230 over an IPMI response.

In some embodiments, variables are defined as key/value pairs that include identifying information, attributes, and some quantity of data. Variables are intended or used as a means to store data that is passed between a UEFI/BIOS environment implemented in a platform and UEFI/BIOS OS loaders and other applications that run in the UEFI/BIOS environment. Although the implementation of variable storage is not specifically defined for a given platform, variables generally need to persist across reboots of the platform. This implies that the variables passed in for storage are retained and available for use each time the system boots, at least until they are explicitly deleted or overwritten. Thus, the variables are normally stored in non-volatile storage. Provision of this type of non-volatile storage may be limited on some platforms. In some embodiments, some variables are stored in a flash 286 of the computer system 200. Alternatively, or in addition, some variables are stored in an EFI system partition 290, and/or OS partition 292

A fully qualified UEFI variable name includes both a human-readable text value paired with a GUID. Each UEFI variable also has some attributes associated therewith, such as (but not limited to) non-volatile attribute, bootservice attribute, and runtime attribute. In some embodiments, these attributes are treated as a bit field, which implies that none, any, or all of the bits can be activated at any given time. For example, the existence of the non-volatile bit indicates that the variable is persistent across platform resets. The existence of the BootService bit indicates that the variable can be reset during the BootService phase of a platform evolution, and once the platform enters the runtime phase, the variable will no longer be set. The existence of the Runtime bit indicates the variable is accessible during all phases of the platform evolution.

Figure 3:
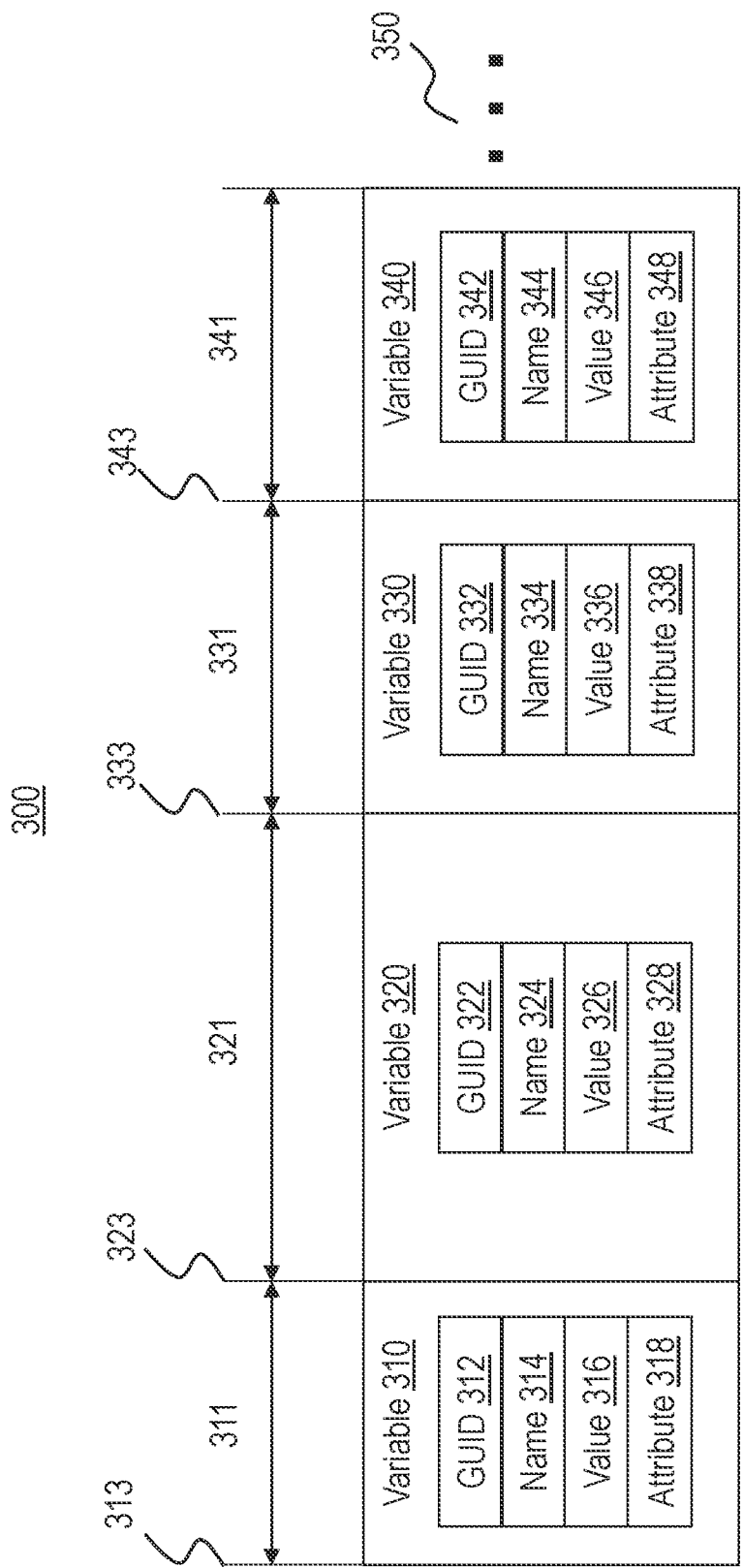
FIG. 3 illustrates an example data structure of variables that may be stored in a hardware storage device of a computer system.

FIG. 3 illustrates an example data structure 300 for storing a plurality of variables 310, 320, 330, 340. As illustrated, each variable includes a globally unique identifier (GUID), a name, a value, and one or more attributes. For example, the variable 310 includes a GUID 312, a name 314, a value 316, and one or more attributes 318. The variable 310 also has a length 311, indicating a size of the variable, and an offset 313 indicating a distance (displacement) between the beginning of the variable and a beginning of the storage. Similarly, the variable 320 includes GUID 322, a name 324, a value 326, and one or more attributes 328. The ellipsis 350 represents that there may be any number of variables stored in the storage.

The variable 320 also has a length 321 and an offset 323. For example, if variable 310 is the first variable, the offset 313 would be 0. Since the variable 320 is a variable right next to variable 310, the offset 323 of the variable 320 would be the same as the length 311 of the variable 310. Again, similar to variables 310, 320, variables 330, 340 also include their respective GUIDs 332, 342, names 334, 344, values 336, 346, and attributes 338, 348; and variables 330, 340 also have their respective lengths 331, 341, and offsets 333, 343.

These variables can be accessed via components of firmware 230, e.g., variable manager 232 of FIG. 2. In some embodiments, the variable manager 232 provides one or more variable functions configured to get a value of a given variable. For example, UEFI provides GetVariable, GetNextVariableName, and SetVariable functions.

The GetVariable function can be used to return a value of a UEFI variable. GetNextVariableName function can be used to enumerate the current variable names. The GetNextVariableName function enumerates the current variable name in the platform, and with each subsequent call to the function, the previous results can be passed into the interface; and on output, the interface returns the next variable name data. Once the entire list of variables has been returned, a subsequent call into the function providing the previous "last" variable name will provide the equivalent of a "Not Found" error.

The SetVariable function can be used to set a value of a variable. For instance, when the platform initializes the I/O infrastructure and has probed for all known console output devices, it will likely construct a ConOutDev global variable. These global variables have a unique purpose in the platform since they have a specific architectural role to play with a specific purpose.

Referring back to FIG. 2, in some embodiments, the BMC 288 is configured to obtain one or more parameters of a variable, such as (but not limited to) a GUID, a name, a length, offset of the variable, and/or a new value, and communicates the one or more parameters of the variable to the firmware 230 with a read or write request. In response to receiving the one or more parameters of the variable with the read or write request, firmware 230 is caused to call GetVariable or SetVariable function to obtain the value of the variable or set the value of the variable based on the one or more parameters. After the value of the variable is obtained or set, the firmware 230 is then configured to send the value of the variable back to the BMC 288.

In some embodiments, certain communication between the BMC 288 and the firmware 230 is performed via the shared memory 284. For example, in some embodiments, the BMC 288 is configured to store the cause of the SMI in the shared memory 284, and the firmware 230 is configured to access the shared memory 284 to obtain the cause of the SMI. In some embodiments, the request for the one or more parameters of the variable by the firmware 230 and receiving the one or more parameters of the variable from the BMC 288 are performed via an IPMI.

Figure 4:
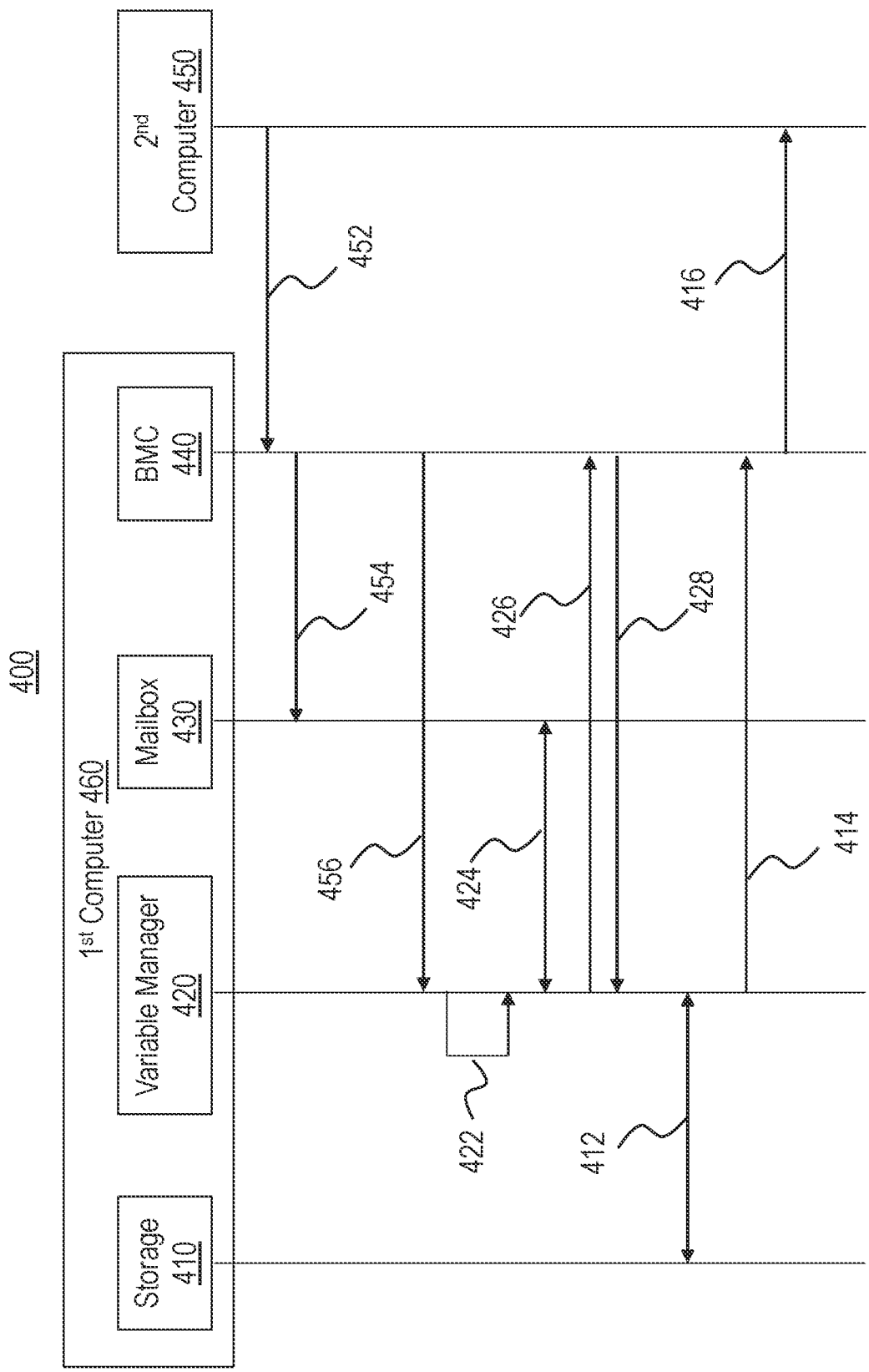
FIG. 4 illustrates an example communication pattern among a first computer system and a second computer system for out-of-band obtaining a value of a variable.

FIG. 4 illustrates an example of a communication pattern 400 among a storage device 410 (corresponding to the flash 286, EFI system partition 290, and/or OS partition 292 of FIG. 2), variable manager 420 (corresponding to firmware 230 of FIG. 2), shared memory (also referred to as a "mailbox 430", corresponding to the shared memory 284 of FIG. 2), a BMC 440 (corresponding BMC 288 of FIG. 2) of a first computer system 460, and a second computer system 450 (corresponding to the second computer system 170 and/or the remote management application 172 of FIG. 1) for out-of-band obtaining a value of a variable.

In some embodiments, the BMC 440 is configured to receive a request from the second computer system 450 for a value of a variable (represented by arrow 452). In some embodiments, the request includes one or more parameters of the variable, such as (but are not limited to) a GUID, a name, a length, an offset, and/or a new value of the variable. In response to receiving the request, the BMC 440 generates a request indicating a cause of the request, such as reading or writing a variable, and stores the request in the mailbox 430 (represented by arrow 454). The BMC 440 also generates an SMI (represented by arrow 456). The SMI causes the first computer system 460 to enter a system management mode, in which the SMI is handled by the variable manager 420.

In response to receiving the SMI, the variable manager 420 then determines whether the SMI is generated by the BMC 440 (represented by arrow 422). In response to determining that the SMI is generated by the BMC 440, the variable manager 420 accesses the mailbox 430 to obtain the cause of the request (represented by arrow 424). In response to obtaining the cause of the request, the firmware then sends a command to BMC 440 for one or more parameters of the variable associated with the cause of the request (represented by arrow 426). The BMC 440 then sends a response to the firmware with the one or more parameters of the variable (represented by arrow 428). The one or more parameters of the variable include (but are not limited to) a GUID, a name, a length, an offset, and/or a new value of the variable.

In response to receiving the one or more parameters, the variable manager 420 is then configured to read or write a value of the variable from the storage device 410 (represented by arrow 412) based on the one or more parameters and the cause of the request. After reading or writing the value of the variable, the variable manager 420 then sends the value or new value of the variable to the BMC 440 (represented by arrow 414), which in turn can send the received value of the variable to the second computer system 450 (represented by arrow 416).

In some embodiments, the command issued by the firmware 230 for requesting additional information associated with the variable is an Intelligent Platform Management Interface (IPMI) command. The BMC sends the one or more parameters to the firmware 230 over an IPMI response.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
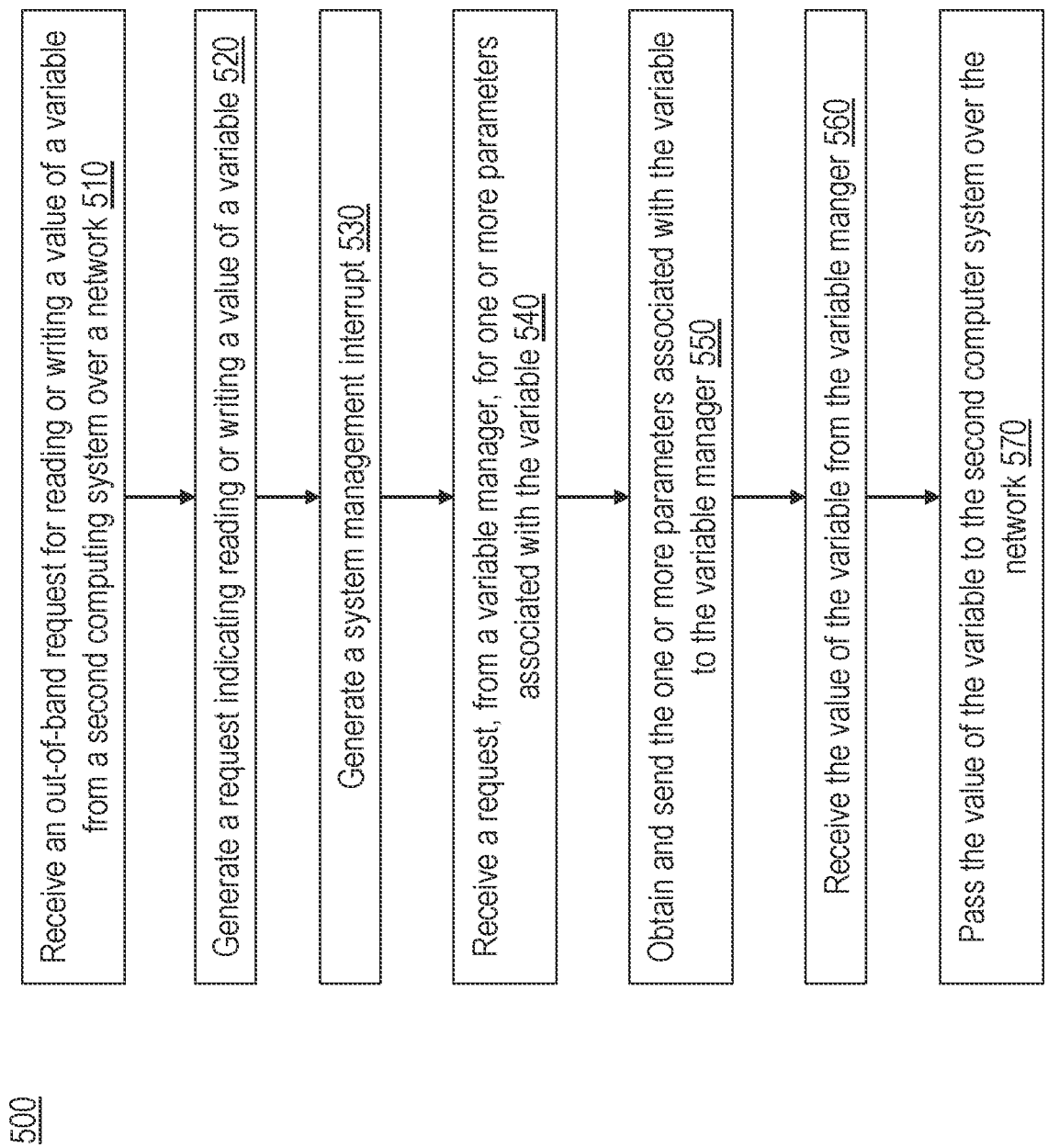
FIG. 5 illustrates a flowchart of an example method for obtaining a value of a variable, which may be implemented at a baseboard management controller (BMC) of a computer system.

FIG. 5 illustrates a flowchart of an example method 500 for out-of-band obtaining a value of a variable, which may be performed by a BMC of a computer system. The method 500 includes receiving an out-of-band request for reading or writing a value of a variable from a second computer system over a network (act 510). In response to receiving the request, the BMC is configured to generate a request indicating reading or writing a value of a variable (act 520) and generate a system management interrupt (act 530), causing a computer system to enter a system management mode, such that the request is handled by firmware of the computer system. In some embodiments, the variable is a boot firmware configuration variable, such as a UEFI variable or BIOS variable.

The method 500 further includes receiving a request from a variable manager, for one or more parameters associated with the variable (act 540). The one or more parameters include at least one of a name, a GUID, an offset, a length, and/or a new value of the variable. The variable manager is a component of the firmware. In some embodiments, the request is an IPMI command. In response to receiving the request, the BMC obtain and send the one or more parameters associated with the variable to the variable manager (act 550). The variable manager is configured to read the value of the variable or overwrite the value of the variable with a new value based on the request and the one or more parameters of the variable and send the value or the new value of the variable to the BMC. Once the BMC receives the value of the variable from the variable manager (act 560), the BMC is configured to pass the value of the variable to the second computer system over the network (act 570).

In some embodiments, the BMC Is further configured to detect an error associated with hardware or firmware of the computer system. In some embodiments, the error prevents the computer system from starting up. In response to detecting the error, the BMC is configured to send an out-of-band error report to the second computer system over the network. In some embodiments, the out-of-band error report contains the value of the variable.

Figure 6:
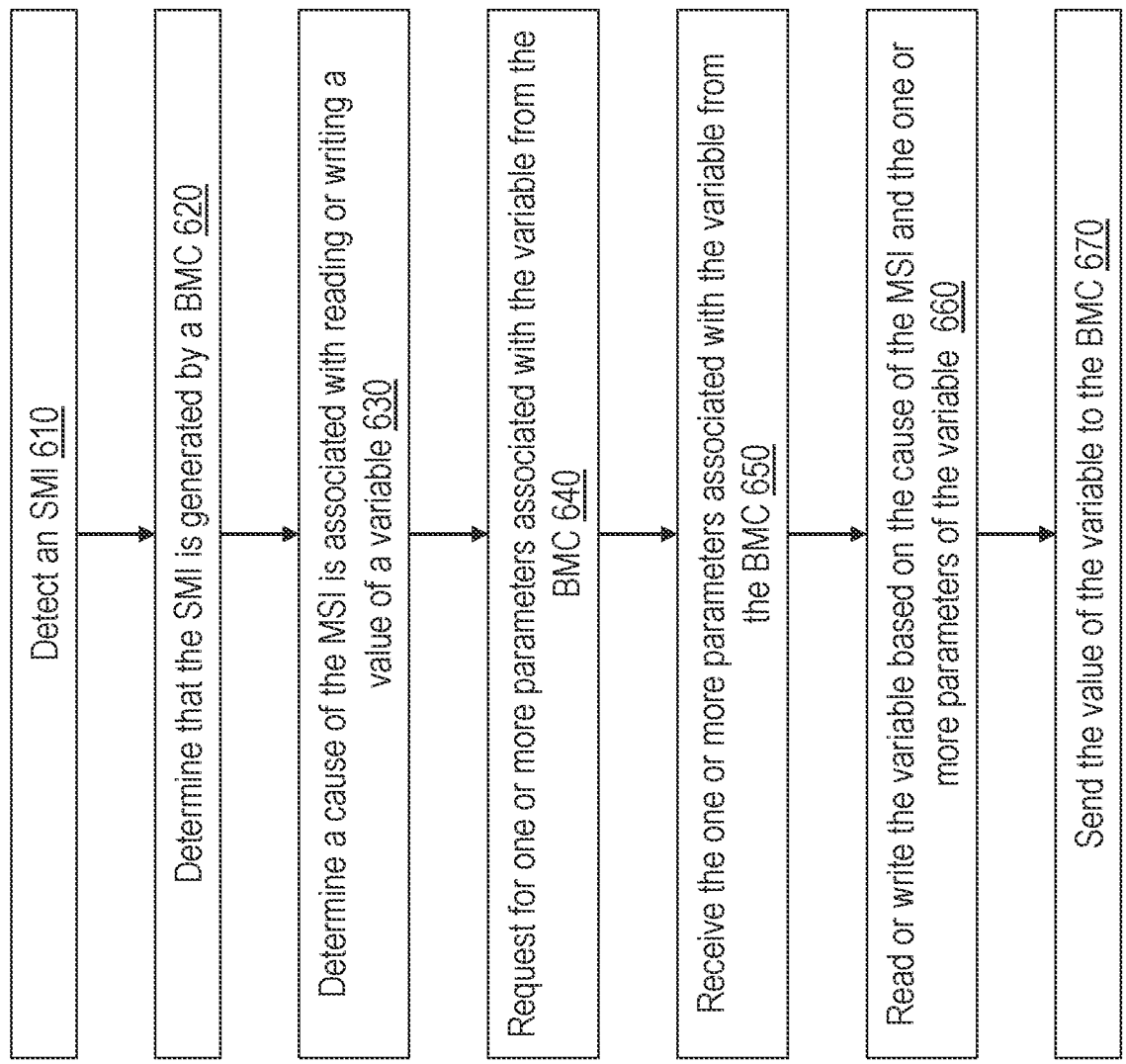
FIG. 6 illustrates a flowchart of an example method for obtaining a value of a variable, which may be implemented at a variable manager of a computer system, where the variable manager is a component of a firmware.

FIG. 6 illustrates a flowchart of another example method 600 for obtaining a value of a variable, which may be performed by a component of firmware of a computer system. The method 600 includes detecting an SMI (act 610). The SMI causes the computer system enters a system management mode, in which a request associated with the SMI is handled by the firmware of the computer system. The method 600 further includes determining that the SMI is generated by a BMC (act 620). The method 600 further includes determining a cause of the SMI (act 630). In particular, it is determined whether the cause of the SMI is associated with reading or writing a value of a variable. In response to determining that the cause of the SMI is associated with reading or writing a value of a variable, the firmware then requests for one or more parameters associated with the variable from the BMC (act 640). When the BMC receives the request, the BMC obtains and sends the one or more parameters associated with the variable to the firmware. The one or more parameters includes at least a name, a globally unique identifier (GUID), an offset, a length, and/or a new value of the variable. When the cause of the SMI is associated with writing the value of the variable, the one or more parameters further include a new value that is to be used to overwrite the current value of the variable.

In response to receiving the one or more parameters associated with the variable from the BMC (act 650), the variable manager then reads the value of the variable or overwrites the value of the variable with the new value based on the cause of the SMI and the one or more parameters of the variable (act 660). For example, when the cause of SMI is associated with reading the variable, the value of the variable is read. When the cause of SMI is associated with writing the variable, the value of the variable is overwritten with the new value. The method further includes sending the value or new value of the variable to the BMC (act 670), causing the BMC to pass the value or new value of the variable to a second computer system over an out-of-band network.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 100) that includes hardware, such as, for example, one or more processors (e.g., processor(s) 110) and system memory (e.g., memory 150). Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., memory 150, flash 286, EFI system partition 290, OS partition 292). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computer system, supporting an operating system and perhaps one or more other applications as well. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a,"

"an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed is:

1. A computer system comprising:
one or more processors;
a baseboard management controller (BMC); and
one or more computer-readable hardware storage devices having stored thereon computer-executable instructions including firmware that are structured such that, when the computer-executable instructions are executed by the one or more processors, the computer system is configured to manage a value of a variable via the firmware, managing the value of the variable via the firmware comprising:
  detecting a system management interrupt (SMI), causing the computer system to enter a system management mode in which a request associated with the SMI is handled by the firmware;
  determining that the SMI is generated by the BMC;
  determining a cause of the SMI;
  in response to determining that the cause of the SMI is associated with reading or writing a value of a variable;
    sending a request to the BMC for one or more parameters associated with the variable;
    in response to receiving the one or more parameters associated with the variable,
      reading the value of the variable or overwriting the value of the variable with a new value based on the cause of the SMI and the one or more parameters; and
    sending the value or new value of the variable to the BMC, causing the BMC to pass the value or the new value of the variable to a second computer system over a network.

2. The computer system of claim 1, wherein the BMC is configured to:
receive an out-of-band request for reading or writing the value of the variable from the second computer system over the network; and
in response to receiving the out-of-band request,
generate a request indicating the cause of the SMI; and
generate the SMI.

3. The computer system of claim 2, wherein the request indicating the cause of the SMI is stored in a shared memory, and determining the cause of the SMI includes accessing the shared memory to obtain the cause of the SMI.

4. The computer system of claim 2, wherein the out-of-band request is received when the computer system is turned off or cannot start up.

5. The computer system of claim 4, wherein the BMC is further configured to:
detect an error associated with hardware or firmware of the computer system, the error preventing the computer system from starting up; and
in response to detecting the error, send an out-of-band error report to the second computer system over the network.

6. The computer system of claim 5, wherein the out-of-band error report contains the value of the variable.

7. The computer system of claim 1, wherein the variable is a boot firmware configuration variable.

8. The computer system of claim 1, wherein the variable is a unified extensible firmware interface (UEFI) boot firmware configuration variable, or basic input/output system (BIOS) firmware configuration variable.

9. The computer system of claim 1, wherein:
the one or more parameters include at least one of a name, a globally unique identifier (GUID), an offset, a length, or the new value of the variable.

10. The computer system of claim 9, wherein the BMC is configured to receive the one or more parameters associated with the variable from the second computer system.

11. The computer system of claim 1, wherein managing the value of the variable via the firmware further includes:
in response to sending the variable to the BMC, clearing the SMI.

12. The computer system of claim 1, wherein sending the request to the BMC for the one or more parameters of the variable is performed via an intelligent platform management interface (IPMI).

13. A method implemented in firmware of a computer system for managing a value of a variable, the method comprising:
detecting a system management interrupt (SMI), causing the computer system to enter a system management mode, in which a request associated with the SMI is handled by the firmware;
determining that the SMI is generated by a BMC;
determining a cause of the SMI;
in response to determining that the cause of the SMI is associated with reading or writing a value of a variable;
  sending a request to the BMC for one or more parameters associated with the variable;
  in response to receiving the one or more parameters associated with the variable from the BMC,
    reading the value of the variable or overwriting the value of the variable with a new value based on the cause of the SMI and the one or more parameters; and
  sending the value or new value of the variable to the BMC, causing the BMC to pass the value or the new value of the variable to a second computer system over a network.

14. The method of claim 13, wherein the BMC is configured to:
receive an out-of-band request for reading or writing the value of the variable from the second computer system over the network; and
in response to receiving the out-of-band request,
generate a request indicating the cause of the SMI; and
generate the SMI.

15. The method of claim 14, wherein the request indicating the cause of the SMI is stored in a shared memory, and determining the cause of the SMI includes accessing the shared memory to obtain the cause of the SMI.

16. The method of claim 14, wherein the out-of-band request is received when the computer system is turned off or cannot start up.

17. The method of claim 16, wherein the BMC is further configured to:

detect an error associated with hardware or firmware of the computer system, the error preventing the computer system from starting up; and in response to detecting the error, send an out-of-band error report to the second computer system over the network.

18. The computer system of claim 1, wherein the variable is a unified extensible firmware interface (UEFI) boot firmware configuration variable, or basic input/output system (BIOS) firmware configuration variable.

19. The computer system of claim 1, wherein the one or more parameters include at least one of a name, a globally unique identifier (GUID), an offset, a length, or the new value of the variable.

20. A hardware storage device having stored computer-executable instructions that are executable by one or more processors of a computer system for causing the computer system to perform the following:

detect a system management interrupt (SMI), causing the computer system to enter a system management mode in which a request associated with the SMI is handled by the computer-executable firmware instructions;

determine the SMI is generated by a BMC;

determine a cause of the SMI;

in response to determining that the cause of the SMI is associated with reading or writing a value of a variable;

send a request to the BMC for one or more parameters associated with the variable, the one or more parameters including at least one of a name, a globally unique identifier (GUID), an offset, a length, or a new value of the variable;

in response to receiving the one or more parameters associated with the variable, read the value of the variable or overwrite the value of the variable with the new value based on the cause of the SMI and the one or more parameters; and send the value or new value of the variable to the BMC, causing the BMC to pass the value or the new value of the variable to a second computer system over a network.

* * * * *